US011012831B2

(12) United States Patent
Amini et al.

(10) Patent No.: US 11,012,831 B2

(45) **Date of Patent: *May 18, 2021**

(54) DISTRIBUTED MULTI-BAND WIRELESS NETWORKING SYSTEM

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/981,765

(22) Filed: May 16, 2018

(65) Prior Publication Data

US 2018/0261061 A1 Sep. 13, 2018

Related U.S. Application Data

(63) Continuation of application No. 15/464,216, filed on Mar. 20, 2017, now Pat. No. 9,979,517.

(Continued)

(51) Int. Cl.

*H04W 72/04* (2009.01)
*H04W 4/00* (2018.01)

(Continued)

(52) U.S. Cl.

CPC ............ *H04W 4/30* (2018.02); *G01S 5/0289* (2013.01); *G01S 5/0294* (2013.01); *G01S 19/46* (2013.01); *G08B 13/2494* (2013.01); *H04B 1/005* (2013.01); *H04B 1/713* (2013.01); *H04B 17/0085* (2013.01); *H04B 17/318* (2015.01); *H04B 17/345* (2015.01); *H04L 5/003* (2013.01); *H04L 12/4633* (2013.01); *H04L 41/12* (2013.01); *H04L 43/08* (2013.01); *H04L 43/0864* (2013.01); *H04L 43/0888* (2013.01);

(Continued)

(58) Field of Classification Search

CPC ..... H04W 16/14; H04W 84/18; H04W 88/06; H04W 40/02; H04W 40/12; H04W 4/80; H04W 88/04; H04L 45/22; H04L 41/0668; H04L 45/04; H04L 61/6022; H04L 69/40; H04L 12/66

See application file for complete search history.

(56) References Cited

U.S. PATENT DOCUMENTS

| | | | |
|---|---|---|---|
| 9,338,638 | B1 | 5/2016 | Palin et al. |
| 2004/0264379 | A1 | 12/2004 | Srikrishna et al. |

(Continued)

FOREIGN PATENT DOCUMENTS

| | | | |
|---|---|---|---|
| CN | 1354924 | A | 6/2002 |
| CN | 101390029 | A | 3/2009 |

(Continued)

*Primary Examiner* — Sai Aung

(74) *Attorney, Agent, or Firm* — Perkins Coie LLP

(57) ABSTRACT

Disclosed is a dedicated control channel for a WLAN network. A number of access points are networked together and communicate data necessary to propagate the WLAN over a backhaul channel, however a dedicated radio on each access point is used to communicate control information between the access points. The control information is communicated over a control channel that is different from the client facing channels or bands, and the backhaul channel. In some embodiments, the control channel is sub 1 GHz.

33 Claims, 13 Drawing Sheets

D5
N3
D6
C1
N2
D7
C4
N4
D1
N1
N5
C2
D2
N7
D4
D3
N6
D8
C3
N8

Related U.S. Application Data

(60) Provisional application No. 62/406,325, filed on Oct. 10, 2016.

(51) Int. Cl.

| | |
|---|---|
| ***H04L 5/00*** | (2006.01) |
| ***H04W 4/30*** | (2018.01) |
| ***H04W 4/02*** | (2018.01) |
| ***H04W 4/029*** | (2018.01) |
| ***H04W 76/11*** | (2018.01) |
| ***H04W 16/26*** | (2009.01) |
| ***G08B 13/24*** | (2006.01) |
| ***H04L 12/26*** | (2006.01) |
| ***H04L 12/24*** | (2006.01) |
| ***H04W 12/08*** | (2021.01) |
| ***H04W 36/00*** | (2009.01) |
| ***H04W 36/36*** | (2009.01) |
| ***H04W 36/16*** | (2009.01) |
| ***H04W 28/04*** | (2009.01) |
| ***H04B 17/318*** | (2015.01) |
| ***H04W 28/02*** | (2009.01) |
| ***H04W 84/12*** | (2009.01) |
| ***H04L 29/08*** | (2006.01) |
| ***H04W 36/24*** | (2009.01) |
| ***H04W 36/32*** | (2009.01) |
| ***H04W 36/38*** | (2009.01) |
| ***H04W 4/70*** | (2018.01) |
| ***H04W 4/80*** | (2018.01) |
| ***H04L 12/46*** | (2006.01) |
| ***H04B 1/00*** | (2006.01) |
| ***H04B 1/713*** | (2011.01) |
| ***H04W 80/06*** | (2009.01) |
| ***H04W 84/04*** | (2009.01) |
| ***H04W 84/10*** | (2009.01) |
| ***H04B 17/345*** | (2015.01) |
| ***H04B 17/00*** | (2015.01) |
| ***G01S 5/02*** | (2010.01) |
| ***G01S 19/46*** | (2010.01) |
| ***H04W 36/20*** | (2009.01) |
| ***H04W 72/08*** | (2009.01) |
| *H04W 84/18* | (2009.01) |
| *H04W 48/02* | (2009.01) |
| *H04W 76/15* | (2018.01) |
| *H04W 12/00* | (2021.01) |
| *H04L 12/751* | (2013.01) |
| *H04W 88/08* | (2009.01) |
| *H04W 88/10* | (2009.01) |
| *H04W 92/20* | (2009.01) |
| *H04B 1/715* | (2011.01) |
| *H04W 40/24* | (2009.01) |
| *H04W 8/00* | (2009.01) |
| *H04W 28/18* | (2009.01) |
| *H04W 72/12* | (2009.01) |

(52) U.S. Cl.

CPC ............ *H04L 43/16* (2013.01); *H04L 67/303* (2013.01); *H04W 4/02* (2013.01); *H04W 4/029* (2018.02); *H04W 4/70* (2018.02); *H04W 4/80* (2018.02); *H04W 12/08* (2013.01); *H04W 16/26* (2013.01); *H04W 28/0236* (2013.01); *H04W 28/0289* (2013.01); *H04W 28/04* (2013.01); *H04W 36/0055* (2013.01); *H04W 36/0072* (2013.01); *H04W 36/0083* (2013.01); *H04W 36/0094* (2013.01); *H04W 36/16* (2013.01); *H04W 36/20* (2013.01); *H04W 36/245* (2013.01); *H04W 36/32* (2013.01); *H04W 36/36* (2013.01); *H04W 36/38* (2013.01); *H04W 72/0453* (2013.01); *H04W 72/082* (2013.01); *H04W 76/11* (2018.02); *H04W 80/06* (2013.01); *H04W 84/045* (2013.01); *H04W 84/105* (2013.01); *H04W 84/12* (2013.01); *H04B 2001/7154* (2013.01); *H04L 45/02* (2013.01); *H04W 4/023* (2013.01); *H04W 8/005* (2013.01); *H04W 12/00502* (2019.01); *H04W 12/00503* (2019.01); *H04W 28/18* (2013.01); *H04W 40/246* (2013.01); *H04W 48/02* (2013.01); *H04W 72/1231* (2013.01); *H04W 76/15* (2018.02); *H04W 84/18* (2013.01); *H04W 88/08* (2013.01); *H04W 88/10* (2013.01); *H04W 92/20* (2013.01)

(56) References Cited

U.S. PATENT DOCUMENTS

| | | | | |
|---|---|---|---|---|
| 2008/0181133 | A1 | 7/2008 | Thubert et al. | |
| 2009/0029645 | A1 | 1/2009 | Leroudier | |
| 2010/0137021 | A1 | 6/2010 | Sharret et al. | |
| 2012/0258749 | A1 | 10/2012 | Lenzini et al. | |
| 2014/0003409 | A1 | 1/2014 | Van De Laar et al. | |
| 2014/0071937 | A1 | 3/2014 | Klatt | |
| 2014/0126534 | A1* | 5/2014 | Larsson | H04W 52/248 370/331 |
| 2016/0095108 | A1* | 3/2016 | Ryoo | H04W 72/0426 370/329 |
| 2016/0100437 | A1* | 4/2016 | Armstrong | G05B 11/012 370/249 |
| 2016/0157221 | A1 | 6/2016 | Kim et al. | |
| 2016/0212745 | A1* | 7/2016 | Hiertz | H04W 16/32 |
| 2016/0234807 | A1* | 8/2016 | Levy | H04W 72/005 |
| 2017/0006499 | A1 | 1/2017 | Hampel et al. | |
| 2017/0017214 | A1 | 1/2017 | O'Keeffe | |
| 2017/0064042 | A1* | 3/2017 | Vora | H04W 4/70 |
| 2017/0094575 | A1* | 3/2017 | Bercovici | H04W 36/14 |
| 2017/0332439 | A1 | 11/2017 | Savolainen et al. | |
| 2018/0007673 | A1* | 1/2018 | Fwu | H04L 5/0092 |

FOREIGN PATENT DOCUMENTS

| | | | |
|---|---|---|---|
| CN | 101401482 | A | 4/2009 |
| CN | 101626575 | A | 1/2010 |
| CN | 102742338 | A | 10/2012 |
| CN | 103414746 | A | 11/2013 |
| CN | 103703850 | A | 4/2014 |
| CN | 104094564 | A | 10/2014 |
| CN | 104320314 | A | 1/2015 |
| CN | 104579610 | A | 4/2015 |
| WO | 2012152430 | A1 | 11/2012 |

* cited by examiner

DISTRIBUTED MULTI-BAND WIRELESS NETWORKING SYSTEM

CROSS REFERENCE TO RELATED APPLICATIONS

This application is a continuation of U.S. patent application Ser. No. 15/464,216, filed Mar. 20, 2017, now U.S. Pat. No. 9,979,517, which claims priority to U.S. provisional patent application No. 62/406,325, filed Oct. 10, 2016, each of which applications are incorporated herein in their entirety by this reference thereto.

BACKGROUND

Wireless access points broadcast information to a number of devices using variable frequency channels within frequency bands using a number of communication protocols. One such protocol is IEEE 802.11, better known as WiFi. WiFi provides Internet access to connected devices and also provides in-network communication between devices. In order to increase the range of WiFi networks, multiple access points are often employed. The multiple access points require some coordination amongst one another and communicate wirelessly to achieve this coordination.

Another protocol type available to access points are machine-to-machine protocols. The most famous of such protocols is commonly known as Bluetooth. Machine-to-machine protocols enable communication on similar frequency bands as WiFi, though machine-to-machine protocols tend to have significantly lower power and frequency channel sizes.

Problems inherent in wireless networks as supported by access points are often related to range and interference.

SUMMARY

Introduced here is a multi-band (e.g., 2.4 GHz, 5 GHzm etc.) wireless networking system and methods for operating the same. Solutions to extending the range of machine-to-machine (M2M) protocols involve tunneling M2M communications within WiFi transmissions between access points, thereby enabling instructions to be delivered to an M2M device from any location either within the same WLAN network, or from the Internet.

Solutions to the interference of coordinating the wireless networking system involve routing certain coordination commands of lower data size on frequencies unused by primary data transmission or most other devices, and have a longer range than the primary data transmission frequencies.

In some embodiments, the multi-band wireless networking system includes multiple wireless networking devices. The networking devices, or access points, including a number of radios. One of the radios is used to transmit network control information between wireless networking devices. The control channel is in a Sub 1 GHz frequency. The control channel is separate from the backhaul channel that transmits network data between each access point. Regardless of the topology of the backhaul channel in the network, the control channel may be in a fully connected topology due to the great range of sub 1 GHz frequencies.

Other aspects of the disclosed embodiments will be apparent from the accompanying figures and detailed description.

This Summary is provided to introduce a selection of concepts in a simplified form that is further explained in the Detailed Description. This Summary is not intended to identify key features or essential features of the claimed subject matter, nor is it intended to be used to limit the scope of the claimed subject matter.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Multi-Band Wireless Networking System

The multi-band wireless networking system (also referred to herein as "system") includes a number of wireless networking devices. Each of the wireless networking devices (also referred to herein as "access point" or "node") of the system has multiple (e.g., three to five) wireless radio components for wireless communications over multiple (e.g., three to five) wireless bands. The system dynamically and automatically selects a channel at which the system is wirelessly connected to the client devices (also referred to herein as "clients"). In some embodiments, each client device is wirelessly connected to the system at a different wireless channel.

At least one of the wireless networking devices is connected to the Internet and serves as a router (also referred to as "base"). The remaining wireless networking device(s) serve as satellite(s) that are wirelessly connected to the router via a dedicated wireless channel. One example of the multi-band wireless networking system is the NETGEAR® Orbi® system.

Figure 1:
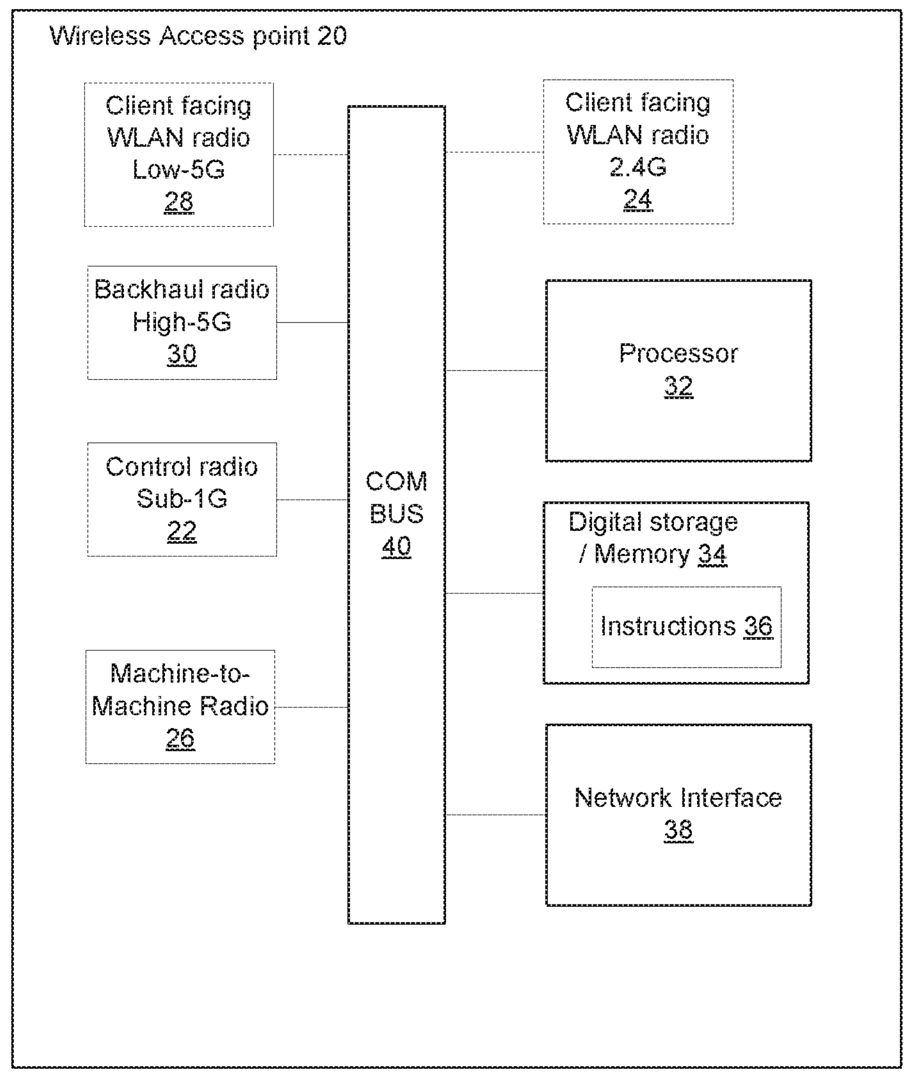
FIG. 1 is a block illustration of an access point.

FIG. 1 is a block illustration of a wireless access point 20. The system conducts an initial channel selection when the system turns on. Then the system conducts a channel change based on a schedule. If there is a need for immediate channel change (e.g., sudden interference on a specific channel), the system conducts a real-time channel change as well.

In some embodiments, the wireless access points 20 (also referred to herein as "APs") of the system include radio components for a number of wireless bands, such as Sub 1 Ghz radio 22, 2.4 GHz band radio 24, M2M 2.4 Ghz radio 26, 5 GHz low band radio 28, and 5 GHz high band radio 30. The AP 20 also includes a processor 32 for executing program logic, a digital storage or memory 34 including instructions 36 to be executed by the processor 32. Each AP 20 includes a network interface 38 for connecting to a wired network and providing overall access to the Internet to the system, though generally only the base unit or base AP is actually connected. These components are in communication using a communications BUS 40.

The Sub 1G radio 22 and the 5 Ghz high band radio 30 may be dedicated to the wireless communications among the APs 20 of the system. The wireless communications among the APs 20 of the system are called backhaul communications. As a general matter, backhaul communications generally refer to two different sorts of communications: coordination and control communications ("control signal"), and communications propagating the data passed throughout the network. The latter of these communications is much more bandwidth intensive. This is because these communications include all the files, streaming content, video game data, and other large communications downloaded and uploaded across the network. For the purposes of this disclosure, the data intensive portion communication between the APs will continue to be referred as "backhaul" communications, and the control and coordination communications are referred to as the "control signal" communications.

The other bands are available for use for wireless communications between the APs 20 of the system and client devices. Client devices may communicate over a number of protocols. The wireless communications between the wireless networking devices of the system and client devices are called fronthaul communications. These radios are also referred to as "client facing."

In some embodiments, uses the 2.4 GHz band radio 24, the 2.4 Ghz M2M protocol radio, and 5 GHz low band radio 28 for fronthaul communications. For example, when the 2.4 GHz band radio 24 is used for fronthaul communications, each AP of the system can operate on a different channel in the 2.4 GHz band (a band can include multiple channels.) The decision for a best channel for each unit can be made based on various factors, such as network topology, number of interfering APs on each channel for each unit, noise on each channel for each unit, interference duration as percentage of time for each unit, type of network traffic supported for each unit, etc.

If the data backhaul channel (e.g., a channel in the 5 GHz high band) goes down, the 2.4 GHz band is used as a backup for data backhaul communications among units of the system. For example, if an AP 20 operating in satellite mode detects that the backhaul channel in the 5 GHz high band is no longer available (e.g., due to strong interference), the unit's 2.4 GHz radio component switches to a scan mode to look for an uplink connection at one of the 2.4 GHz channel with another unit operating in router mode.

If there are multiple clean channels available for a unit, the unit selects a clean channel that interferes less with other units that are in vicinity. A client channel is defined based on a function of interference, number of APs, and/or other parameters. If the function for a channel is less than a threshold, the channel is a clean channel. There are various ways to detect units in vicinity. For example, one method uses networking topology among the units to detect units in vicinity. Beacon power from other units is used to detect units in vicinity. In some embodiments, a unit uses a combination of networking topology and beacon power to detect other units of the system in vicinity.

The APs 20 communicate the fronthaul channel selections with other units through the dedicated backhaul channel. In some embodiments, units having higher-priority network traffic have a higher priority in picking the fronthaul channel over other units.

The system of APs 20 make decisions regarding fronthaul channel selections in either a centralized way or a distributed way. In a distributed way, each unit makes a decision on channel selection for itself. For example, in some embodiments, a base unit selects a fronthaul channel first. Then, each satellite AP 20 selects a fronthaul channel after the base unit establishes a backhaul link with the base unit. The system optimizes the channel selection based on some regular schedule. In some embodiments, units handling higher-priority network traffic has a higher priority in picking the fronthaul channel over other APs 20 during system boot-up or during scheduled channel optimization.

In a centralized way, the base AP 20 makes decisions of channel selections for all APs 20 of the system. This may be communicated through a control signal. Each satellite AP 20 establishes a dedicated control signal link with the base unit and scans the channels in the fronthaul band(s). Each satellite AP 20 sends detailed information regarding candidates of fronthaul channels to the base unit. The detailed information includes, e.g., scan results on all channels in the fronthaul band(s) and interference on all channels in the fronthaul band(s). The base AP makes the centralized decision on channel selection periodically over time among other control communications.

Dedicated Control Channel

In some embodiments, the system uses a dedicated channel (e.g., outside of 2.4 GHz or 5 GHz bands) for control signal communications. For example, the APs 20 of the system may use frequencies between 433 MHz through 928

MHz. Within this range are two regulated industrial, scientific, and medical (ISM) bands. These two bands are casually referred to as the 433 MHz band and the 900 MHz band. These bands actually range between 433.05 MHz-434.79 MHz and 902 MHz-928 Mhz. This frequency range typically has significantly less use than the 2.4 GHz band or the 5 GHz band as a result that less devices use 433-928 MHz. One reason for the comparative non-use is that this frequency range carries less information due to the significantly longer wavelengths (more time passes for the electromagnetic radiation to cycle through the period of each wavelength of data). However, the other result of the greater wavelength is that communications have much longer ranges than bands used in other radios 24-30 at the same power (often reaching over a mile). In the case of messages sent over a control signal, the tradeoffs are beneficial.

The dedicated control channel is used to transfer critical messages. Critical messages are those messages which enable consensus between the APs of a network of the basic premises for which network level decisions are made. Communication on the control signal may include: bridges update (e.g., where client is associated), provisioning of new access points, assigning channels to each AP, roaming coordination for clients, timing synchronization, range measurement, and/or synchronization between APs for localization.

With respect to client roaming, when a client roams from one AP to another AP, each AP needs to know where the client is. Thus, when a given AP receives a packet for that client, that AP forwards it to the correct destination AP.

The dedicated control channel is also be used for provisioning. For example, the system uses the control channel to add a new unit to the network of the system without having to go through a standard process for WiFi, which takes a longer time and is prone to interference and packet loss. An interface is defined on the control channel, which enables the current unit (AP) on the system network to provision a new unit (AP) when the system administrator approves the addition of the new unit (AP).

To avoid interference and jamming (unintentional or malicious), the system conducts frequency hopping between different channels. The APs include a wireless radio component for that dedicated channel only for communication related to control and management of the system. The dedicated control radio strengthens the network among the units of the system because WiFi channels on 2.4 GHz or 5 GHz often have intermittent issues. Sending control signals over periodically variable frequencies reduces the danger of jamming.

Having a particular schema for frequency hopping generates a control protocol for the control signal. This also serves to help protect the security of the network. Outside access points are not be able to access the network system unless each includes a dedicated control signal in order to correctly provision with the rest of the network.

If a satellite unit drops offline from the 2.4 GHz or 5 GHz WiFi network, units of the system still signal each other indicating that the satellite unit is dropped from the WiFi network. This is feasible because the control channel has a longer range than the 2.4 GHz or 5 GHz WiFi network. The units of the system also signal one another regarding a change of the backhaul channel through the dedicated control channel.

Figure 2:
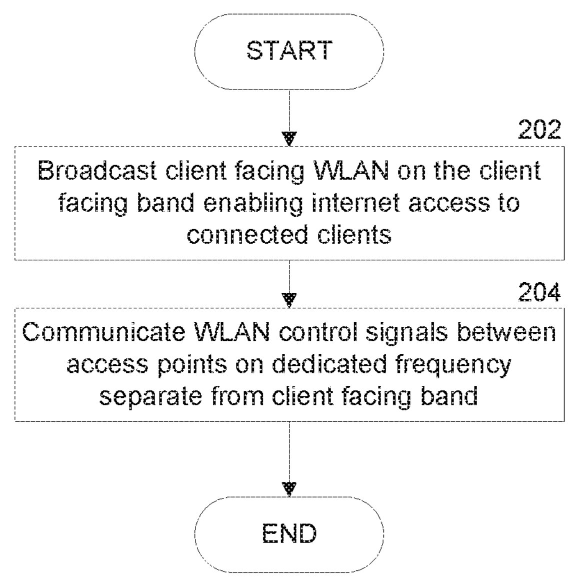
FIG. 2 is a flowchart illustrating a method of communicating control signals between access points.

FIG. 2 is a flowchart illustrating a method of communicating control signals between access points. This is a simple explanation of the method. In step 202, a network of APs broadcast a wireless local area network ("WLAN") on client facing frequencies (such as 2.4 GHz and 5 GHz). This is facilitated through a data backhaul on another set of frequencies (such as the highest channels in the 5 GHz band).

In step 204, the APs communicate control signals between one another on frequencies outside of the client facing bands. In some embodiments, the control signal is operated on Sub 1 Ghz bands such as the 433 MHz band or the 900 Mhz band.

Figure 3:
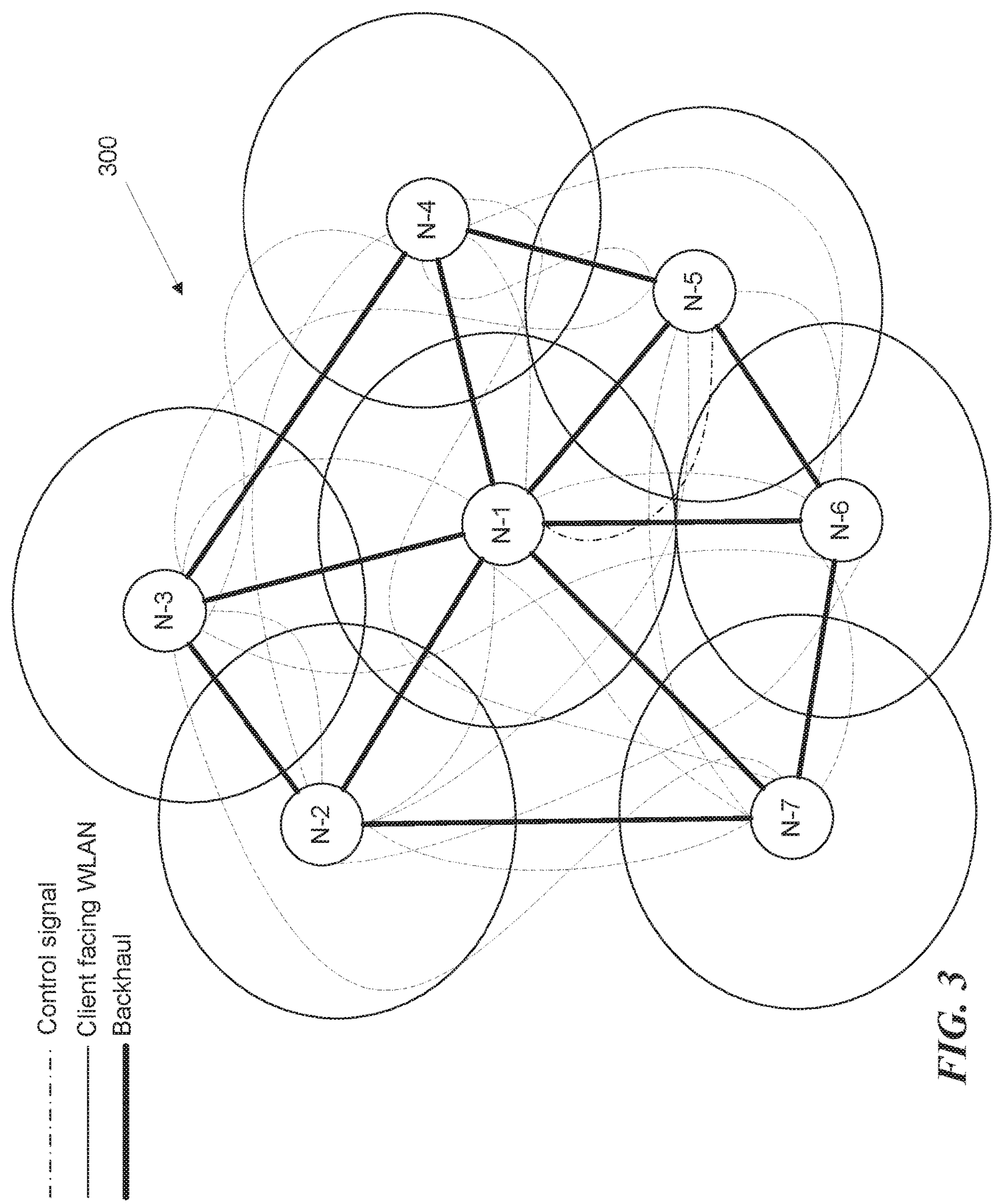
FIG. 3 illustrates an example of a network illustrating a number of simultaneous communication methods in a mesh topology.

FIG. 3 illustrates an example of a network 300 illustrating a number of simultaneous communication methods in a mesh topology. The network 300 includes seven access points, or nodes. N-1 through N-7. The nodes N-1 through N-7 are arranged arbitrarily for illustrative purposes. Node N-1 has been chosen as the node wherein the wired connection to the Internet is located. As a result, N-1 is also assigned as the base unit.

The range of each communication illustrated in network 300 is not intended to be representative of actual ranges available. Network 300 has a mesh topology. This is evident based on the connections of the backhaul communications (thick lines). Each node N-1 through N-7 is connected to all adjacent nodes in range. However, the control signal (dash-dotted lines) directly connect each node to each other node. This is often referred to as fully-connected topology or merely directly connection topology. This is made possible via the increased range of the control signal radio 22.

If network 300 were extended in number of nodes such that the size of network 300 increased substantially, it is feasible that the control signal radio 22 does not have the range to communicate between the farthest nodes of the network 300. However, this is not a concern for the vast majority of cases. In some embodiments, the control signal, given similar power usage as other radios, has greater than a mile of range.

Figure 4:
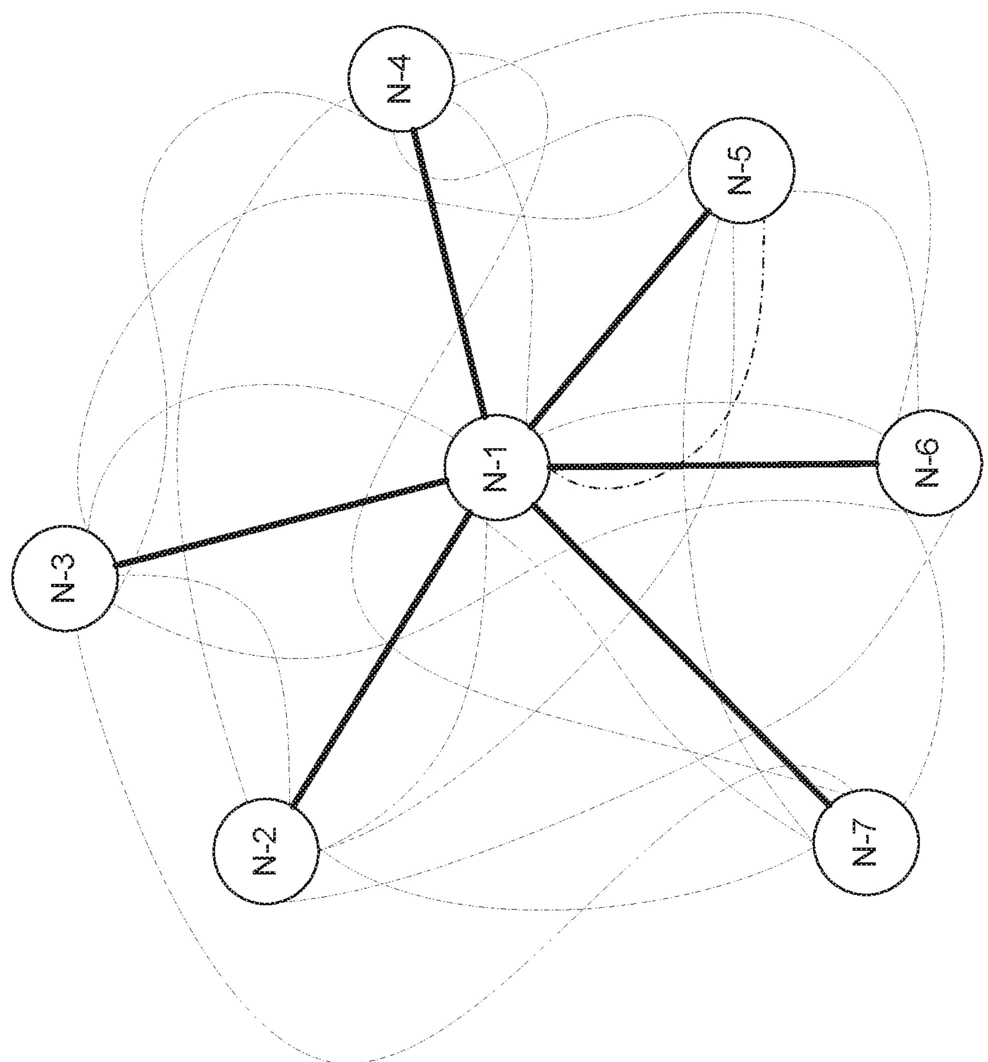
FIG. 4 illustrates an example of a network illustrating a number of simultaneous communication methods in a hub-and-spoke topology.

FIG. 4 illustrates an example of a network 400 illustrating a number of simultaneous communication methods in a hub-and-spoke topology. The network 400 is similar to network 300 of FIG. 3, merely using a different backhaul topology. FIG. 4 serves to illustrate that the dedicated control signal may be employed similarly regardless of backhaul topology.

Figure 5:
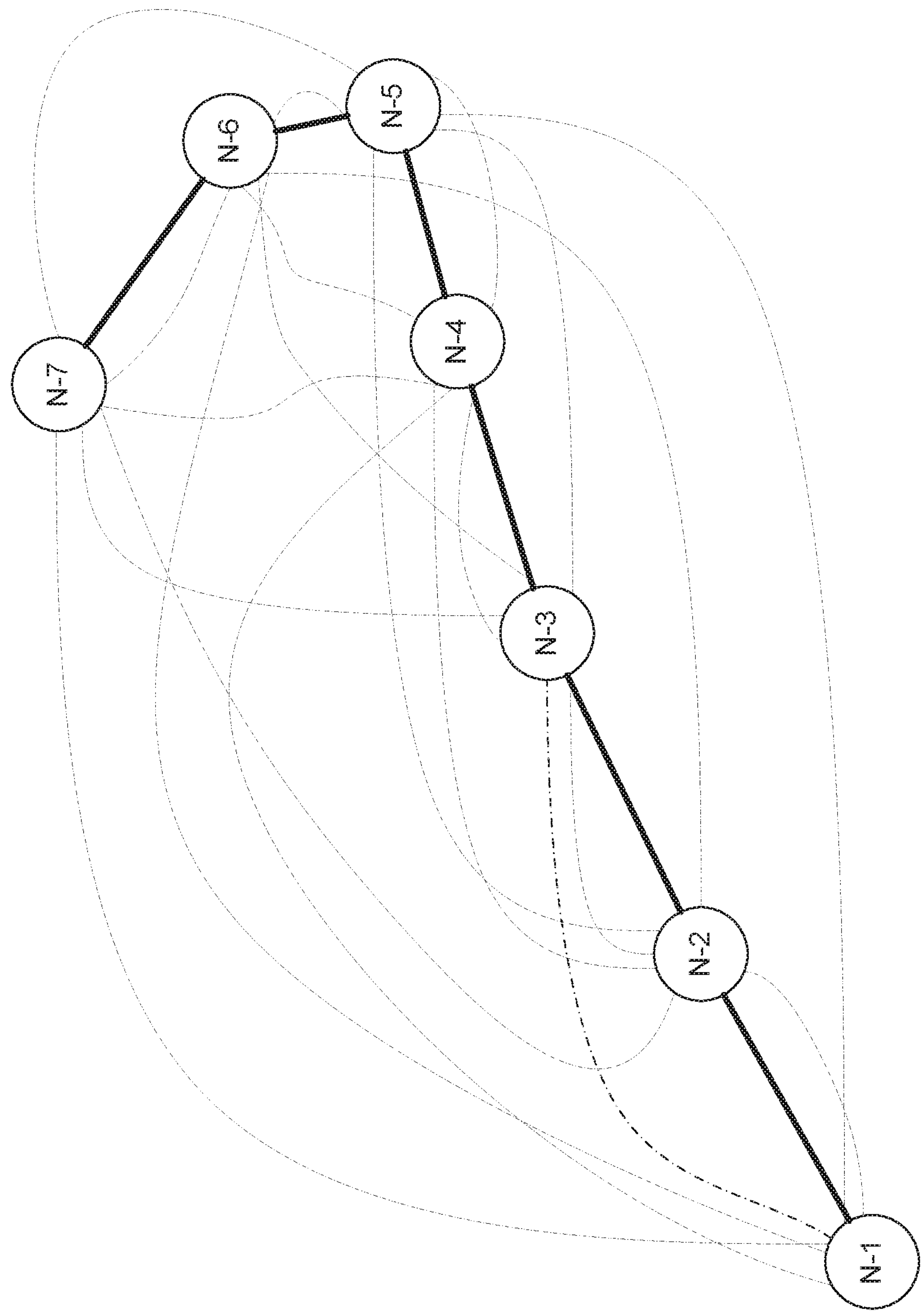
FIG. 5 illustrates an example of a network illustrating a number of simultaneous communication methods in a chain/ring topology.

FIG. 5 illustrates an example of a network 500 illustrating a number of simultaneous communication methods in a daisy-chain topology. It is unlikely that a 5 GHz backhaul radio transmission reaches from one end of the daily chain to the other (e.g., N-1 to N-7 or N-5). However, a Sub 1 GHz dedicated control channel does reach in nearly any reasonable configuration. Accordingly, the dedicated control channel is still in a fully connected topology. FIG. 5 serves to illustrate that the dedicated control signal may be employed similarly regardless of backhaul topology.

Figure 6:
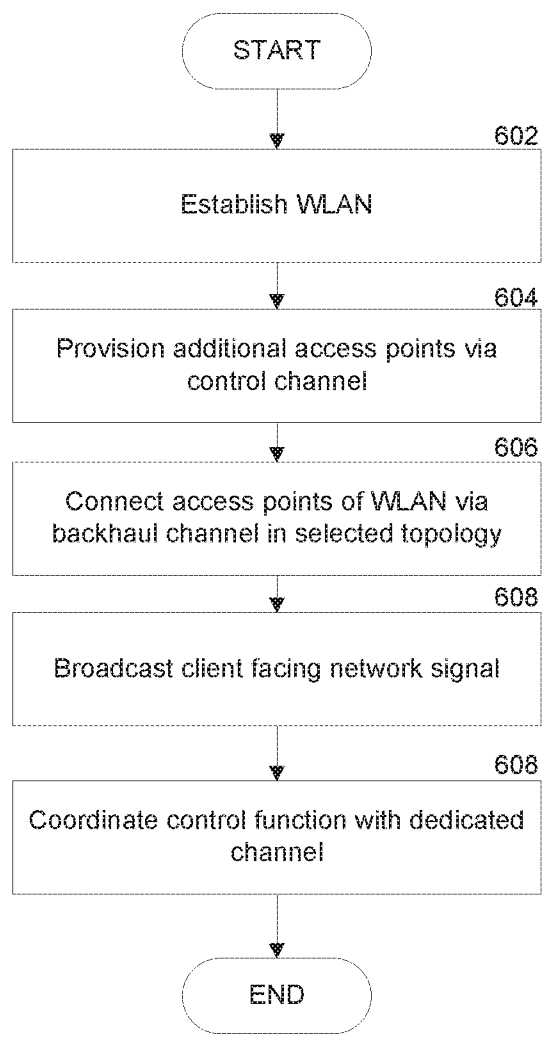
FIG. 6 is a flowchart illustrating a method a method of organizing and provisioning a wireless network with a dedicated control channel.

FIG. 6 is a flowchart illustrating a method a method of organizing and provisioning a wireless network with a dedicated control channel. In step 602, a first access point establishes a WLAN. In step 604, new access points join the WLAN. In order to do this, these access points are provisioned with communication between the first access point and subsequent access points via the control signal radio. These communications are direct despite whatever topology is chosen for the backhaul channel.

In step 606, the APs of the WLAN that have all been provisioned connect to one another via the backhaul channel. The topology may be determined using any suitable known method in the art. The communication required to facilitate the topology determination is made using the control signal. In step 608, continued function of the network is managed on the dedicated control signal channel.

Protocol Tunneling

There are various types of protocols that are bridged (tunneled) over the backhaul channel of the system. For example, Internet of Things (IoT) protocols, or machine-to-machine (M2M) protocols are low data-rate protocols that can be bridged over the backhaul channel of APs. Examples of IoT or M2M protocols are Bluetooth, Bluetooth Low Energy, ZigBee, RFID, and Zwave. The advantage of these protocol tunneling is to extend the range of the M2M protocols that have very limited range. By carrying over the backhaul channel, devices using M2M protocols communicate over a long range that original M2M protocols cannot handle. Likewise, Bluetooth is extended for various applications such as M2M applications or audio applications.

Figure 7:
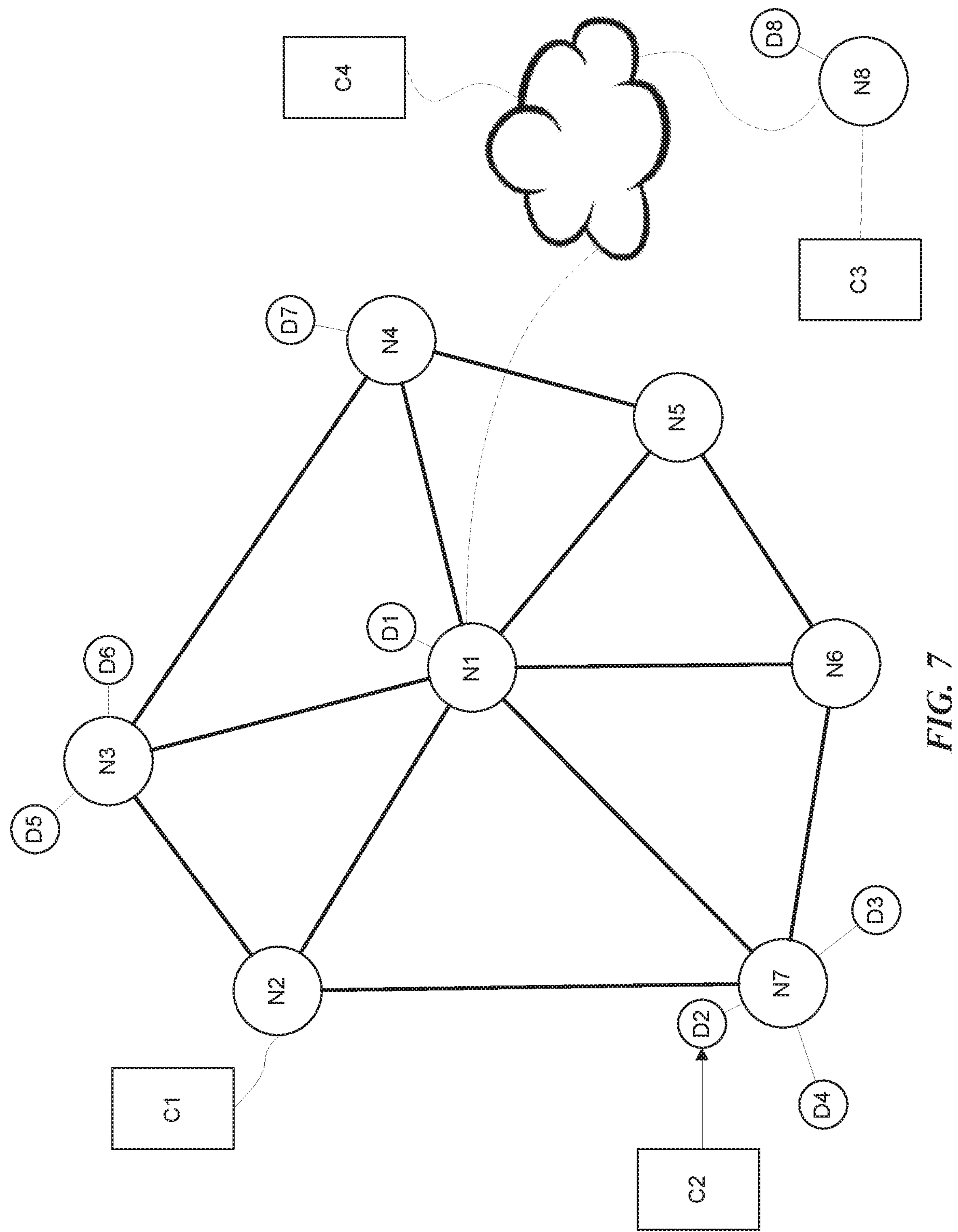
FIG. 7 is an illustration of a network diagram including multiple configurations of communications between connected devices and control devices.

FIG. 7 is an illustration of a network diagram, including multiple configurations of communications between connected devices and control devices. As with previous figures, this network has seven nodes, N1-N7. Node N1 has a wired connection to the Internet, as indicated by the dot-dashed line. The Internet connection of Node N1 is shared with nodes N2 through N7 over the backhaul channel in a mesh topology, as indicated by thick, solid lines, though other topologies are suitable. Additionally connected to the Internet is node N8, which is on a network separate from nodes N17.

Connected across all networks represented are a number of IoT devices represented by circles and control devices (e.g., user operated devices with an operating system and a GUI such as laptops, tablets, smartphones, etc. . . . ) represented by rectangles. Connections using M2M protocols are indicated by thin, dotted lines. Connections using WiFi protocol are indicated by dashed lines. The IoT devices are individually identified by D1-D8. The control devices are identified by C1-C4. The devices and networks of FIG. 7 are intended to provide a structural illustration for methods in subsequent figures.

Using the tunneling, the system extends broadcast range for perimeter sensors such as window sensors, door sensors, thermal sensors, moving sensors, etc. A sensor connects to a nearest unit of the system. The network traffic from the sensor is tunneled to the base unit and other satellite units via the backhaul channel. The network traffic from the sensor is also relayed to a cloud for certain IoT devices.

Figure 8:
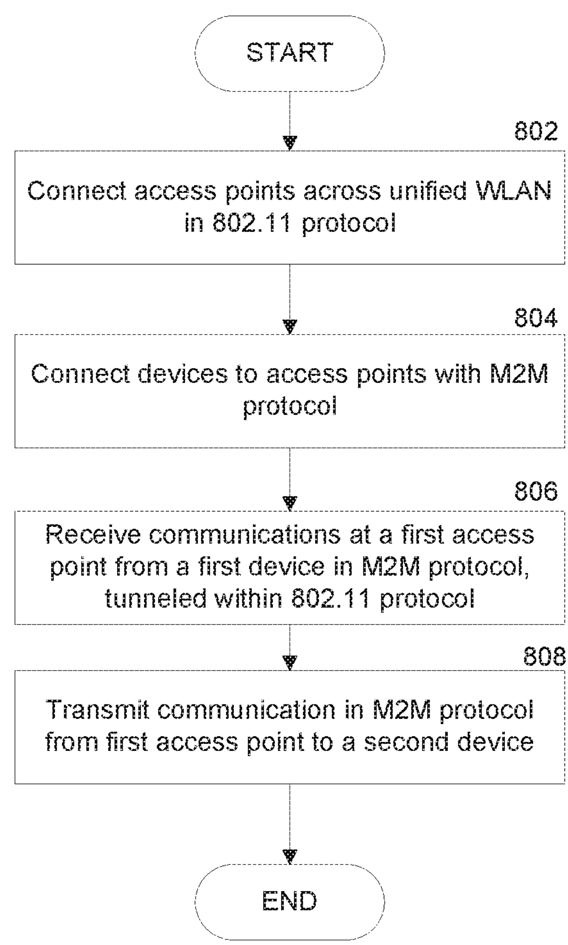
FIG. 8 is a flowchart illustrating a method for receiving protocol tunneled instructions on a connected device.

FIG. 8 is a flowchart illustrating a method for receiving protocol tunneled instructions on a connected device. In step 802, a network is generated between APs using IEEE 802.11 protocol, commonly known as WiFi protocol. This is performed through a backhaul channel and/or a control channel. Referring to FIG. 7, an illustrative example of this step is the thick, solid lines indicating network topology.

In each example (for FIG. 8 and subsequent figures), the system uses different channels on different nodes for tunneling various M2M protocols. In some embodiments, the units of the system has both WiFi and Bluetooth low energy (BLE) capability. Depending on the type of interfaces for the sensory devices, the units use WiFi to connect to the devices or use BLE to connect to the devices and tunnel the BLE communication over the backhaul channel. In some embodiments, one IoT protocol has tunneling communications of another IoT protocol. The tunneling can be used for synchronization, protocol coexistence, power saving, etc.

In step 804, IoT devices, sometimes referred to as "connected devices" connect to the network using the respective M2M protocol of each. This step is illustrated in FIG. 7 based on the thin, dotted lines between connected devices D1-7 and nodes N1-7. The connections between devices D1-7 and nodes N1-7 (and also device D8 and nodes N8) occur a number of ways depending on the M2M protocol involved. In some embodiments, APs N1-7 "pair" with the IoT devices D1-7. In other embodiments, the APs N1-7 communicate with the devices D1-7 based on the use of a generic attribute tables (GATT) or certificates.

To handle the multiple M2M protocols, translation software such as that available through the Open Connectivity Foundation, IFTTT applets, or "Apple Home Kit" as marketed by Apple Inc. may be used. Protocol translation may be performed by using backend servers related to particular control devices and IoT devices, backend servers associated with third parties, or translation software onboard the access points.

In step 806, an access point (e.g. node N1) receives a communication from another device (a IoT device, a control device, or another access point). This other device may be on the network (N2-7, D1-7, or C1-2) or a device on another network (e.g. N8, D8, or C3-4). The communication uses a tunneling M2M protocol inside WiFi protocol. A tunneling protocol is one that encloses in its datagram another complete data packet that uses a different communications protocol. Tunneled protocols essentially create a tunnel between two points on a network that securely transmit any kind of data there between.

An instruction or action for the sensor is transmitted to the sensor through the tunneling using the backhaul channel. A sensor may trigger an action for a target device, e.g., triggering an alarm or turning on a light. The target device (e.g., an alarm or light) may be connected to another unit of the system. The sensor and the target device may communicate over a protocol such as Bluetooth, ZigBee, Zwave, etc. The protocol is tunneled through the WiFi backhaul channel.

In step 808, the access point (e.g., node N1) transmits the communication to a connected IoT device (e.g., device D1). Prior this this occurring, the access point extracts the M2M protocol packets from the communication in order to directly transmit, in M2M protocol, to the IoT device. Where the IoT device uses a different M2M protocol than the communication was in, the access point translates between M2M protocols using translation software stored onboard the access point.

This method enables control range of the IoT device to expand from the comparatively narrow range of protocols such as Bluetooth to much greater ranges. Bluetooth devices such as speakers are often controlled by smartphones having a limited range, which is a hindrance, especially in larger residences (e.g., control device C2 to device D2).

In some embodiments, the system controls lights around a home using Bluetooth or other technologies. Bluetooth lighting control is prominent, but range limited. By tunneling the Bluetooth communications over the WiFi backhaul channel, the control range for the lights is significantly extended.

In some embodiments, the system controls audio speakers over a wide range. Speakers often use Bluetooth protocol. The Bluetooth speaker can be paired with the units of the system. The audio synchronization over Bluetooth is tunneled through the WiFi backhaul channel. The system simultaneously controls different types of Bluetooth speakers. Zwave is used on a lot of sensors and actuators. The system avoids Zwave mesh and uses a long range dedicated backhaul to create a more robust Zwave network.

Figure 9:
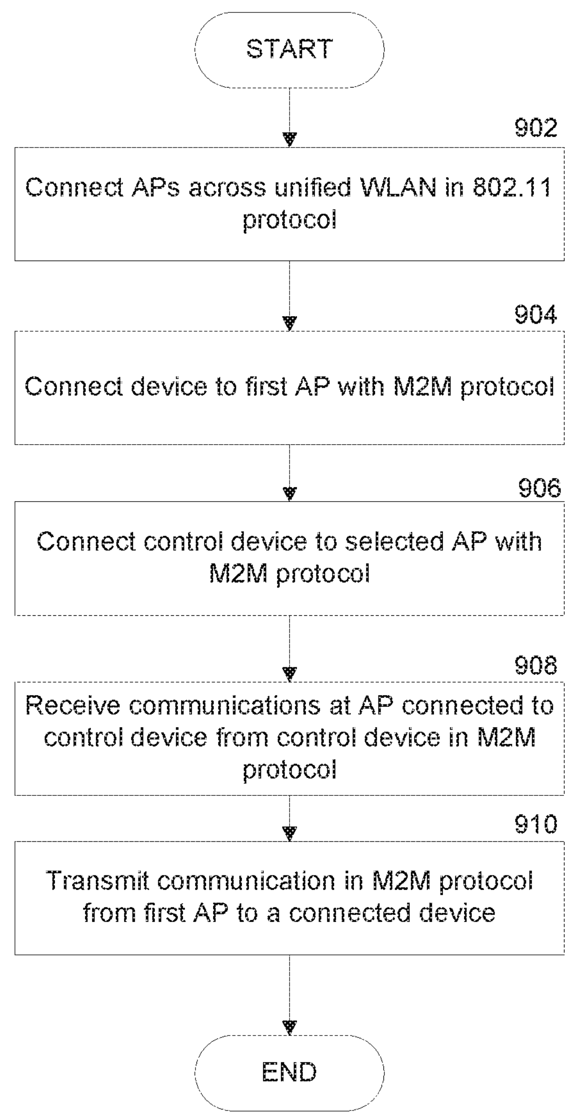
FIG. 9 is a flowchart illustrating a method of controlling a connected device with a networked control device.

FIG. 9 is a flowchart illustrating a method of controlling a connected device with a networked control device. The figure discloses a method similar to that of FIG. 8 directed to a particular use case. The use case described is where a control device connects directly to an access point using a M2M signal, and a command communication is delivered to an IoT device that is otherwise be out of range. For example, referring to FIG. 7, where a command communication is sent via control device C1 to node N2, to node N1, to device D1.

Steps 902, 904, and 910 of FIG. 9, are the same as 802 and 804, and 808 of FIG. 8 respectively. However, in step 906, the control device connects to the access point via M2M protocol. This is an additional step particular to the use case described above. In step 908, the control device transmits a M2M communication received by the AP.

This example additionally works between multiple IoT devices (as opposed to an IoT device and a control device). Where IoT devices, especially sensors, often do not have user interfaces, IoT device/sensors do have output. This output is used to trigger or trip other IoT sensors.

This embodiment has the greatest utility between access points. Where an IoT device only has a low power M2M radio, if two of such devices are within range of an access point, it is also likely each device is in range of one another. Thus, transmitting signals over multiple access points provides utility. Returning to the example, the method of FIG. 9 does not account for one of the links in the chain of communication: node N2 to node N1.

The user experience appears as though the short M2M range had been merely replaced by the user's WiFi network range. The IoT device and the control device are each in communication with an AP (be it the same AP or different, connected APs). The AP's effectively work as a packet forwarding bridge. If a non-pairing protocol is used, such as BLE, the control device's broadcasts are received by any of the APs on the network and forwarded to devices on the network over the network backhaul. Where a pairing protocol is used, the pairing signal is forwarded by the APs. On each end, the AP receives communications in M2M, and then tunnels the M2M communications in a WiFi communication over the backhaul.

Figure 10:
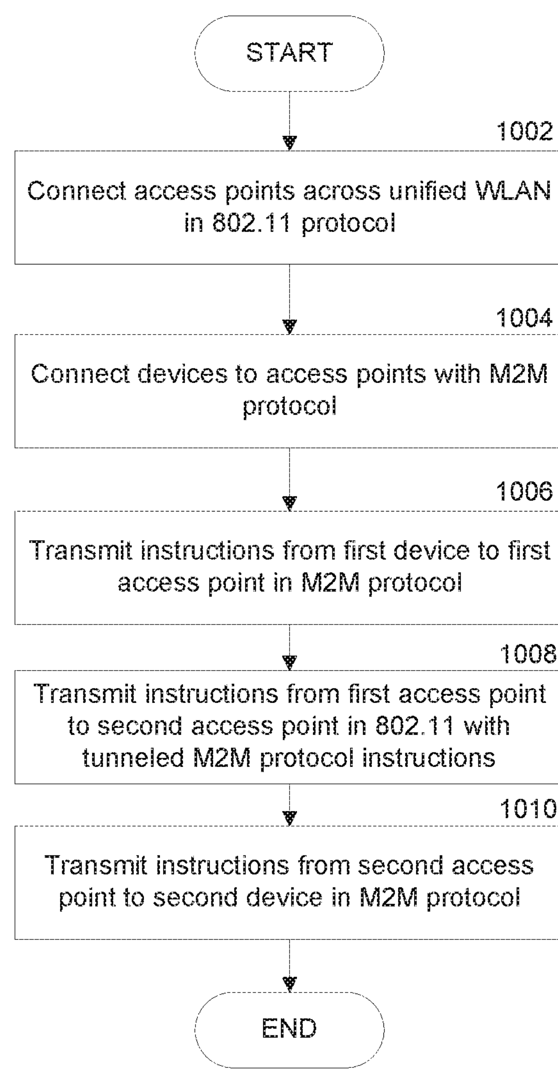
FIG. 10 is a flowchart illustrating a method of communication between two connected devices through a network.

FIG. 10 is a flowchart illustrating a method of communication between two connected devices through a network. Steps 1002, 1004, and 1010 of FIG. 9, are the same as 802 and 804, and 808 of FIG. 8 respectively. Step 1006 is analogous to Step 906. However, in step 1008 the first access point (e.g., node N2) transmits the tunneled communication to the second access point (e.g., node N1). This transmission is performed in WiFi protocol over the backhaul channel with the M2M protocol payload.

The method described in FIG. 10 enables communication over an even greater range. Where the method of FIG. 9 enables the use of WiFi range to communicate with an IoT device, the method of FIG. 10 enables communication over multiple changed WiFi broadcast ranges.

Figure 11:
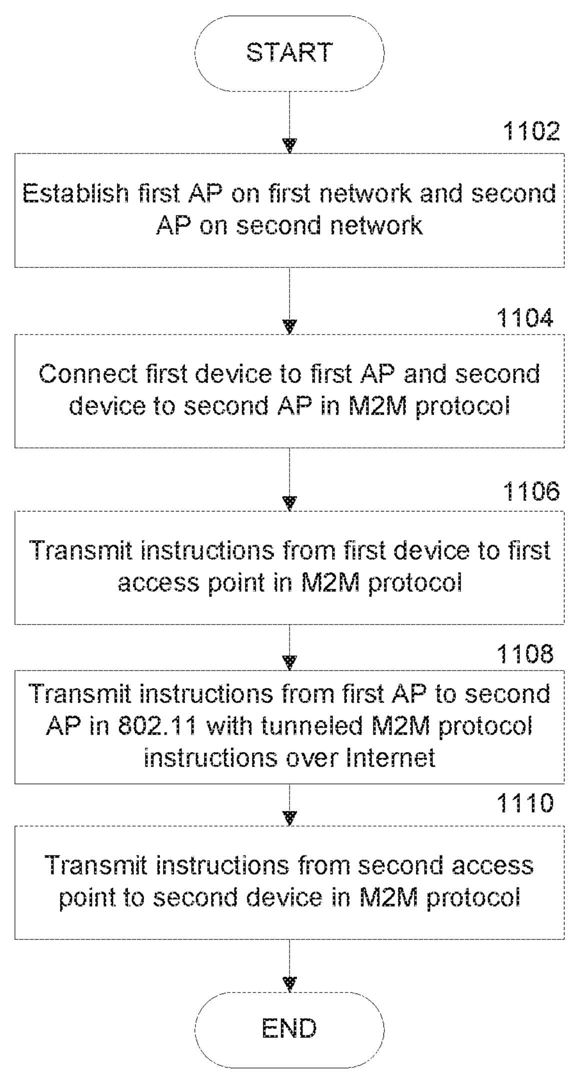
FIG. 11 is a flowchart illustrating a method of communication between connected device on different networks.

FIG. 11 is a flowchart illustrating a method of communication between connected device on different networks. In step 1102, respective access points set up separate WLAN networks (e.g., node N1 and node N8). Each network is connected to the Internet. In step 1104, devices are connected to each network (e.g., devices D1-7 to one network and device D8 or control device C3 to the other network).

In step 1106, a first device (e.g., device D8 or control device C3) communicates with an access point (e.g., node N8) in an M2M protocol. In step 1108, the communication is transmitted to the second access point (e.g., node N4). The access point evaluates an intended destination from the original communication from the first device. This destination may be indicated by a software application joining the two devices or using configuration in the access point. The first access point (e.g., node N8) packages the M2M communication in a WiFi protocol communication and provides a destination address. With the destination address, the communication is delivered over the Internet (e.g., to node N4).

In step 1110, the second access point (e.g., node N4) transmits the communication to the device (e.g., device D7) using the M2M protocol. In order to achieve this, the access point (e.g., node N4) extracts the M2M protocol payload from the WiFi communication, and transmits to the device (e.g., device D7).

Figure 12:
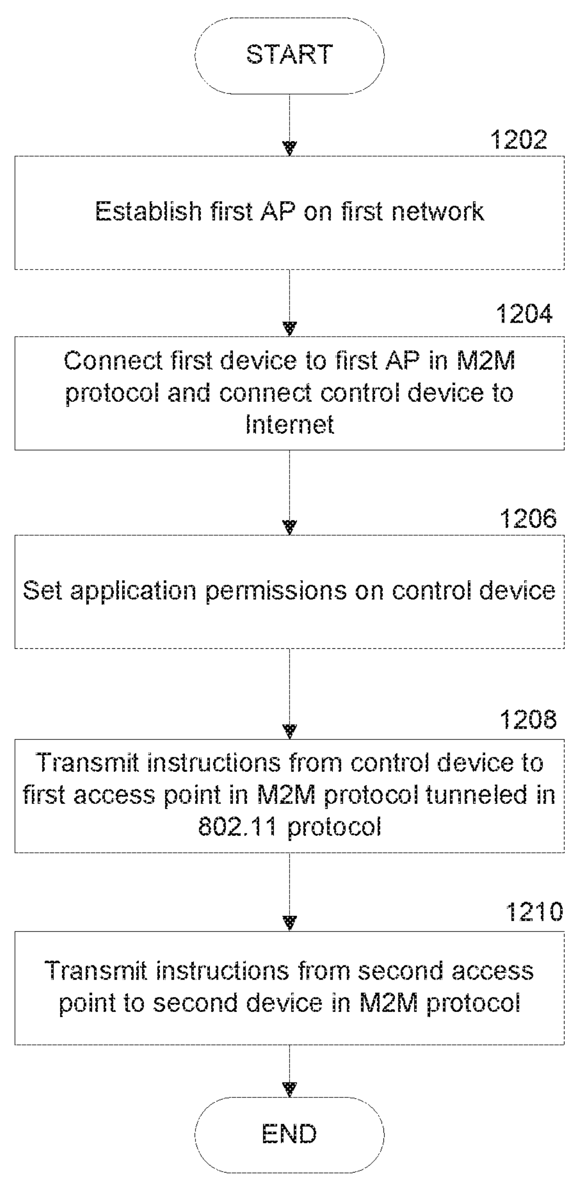
FIG. 12 is a flowchart illustrating a method of communication between a control device on an unknown network and an IoT device on a known network.

FIG. 12 is a flowchart illustrating a method of communication between a control device on an unknown network and an IoT device on a known network. In step 1202, a first network is established using a first AP (e.g., node N1). In step 1204, a first device is connected to the established network (e.g., device D1 to node N1) using an M2M protocol and a control device connects to the Internet (e.g., control device C4). The control device may use any network available (hotspots, open networks, etc.), including cellular networks (e.g., 3G, 4G, LTE, etc.). In step 1206, application software on the control device is configured to the first network (e.g., network broadcast by node N1). The application software enables the AP on the first network to recognize transmissions from the control device.

In step 1208, the control device transmits instructions to the AP on the first network using a M2M communication tunneled in a WiFi communication. Information in packets of the communication, as generated by the application software on the control device, indicates authorization to the AP. The authorization includes further routing instructions. In step 1210, the AP extracts the M2M communication from the original transmission and forwards the communication to the IoT device (e.g., device D1).

Figure 13:
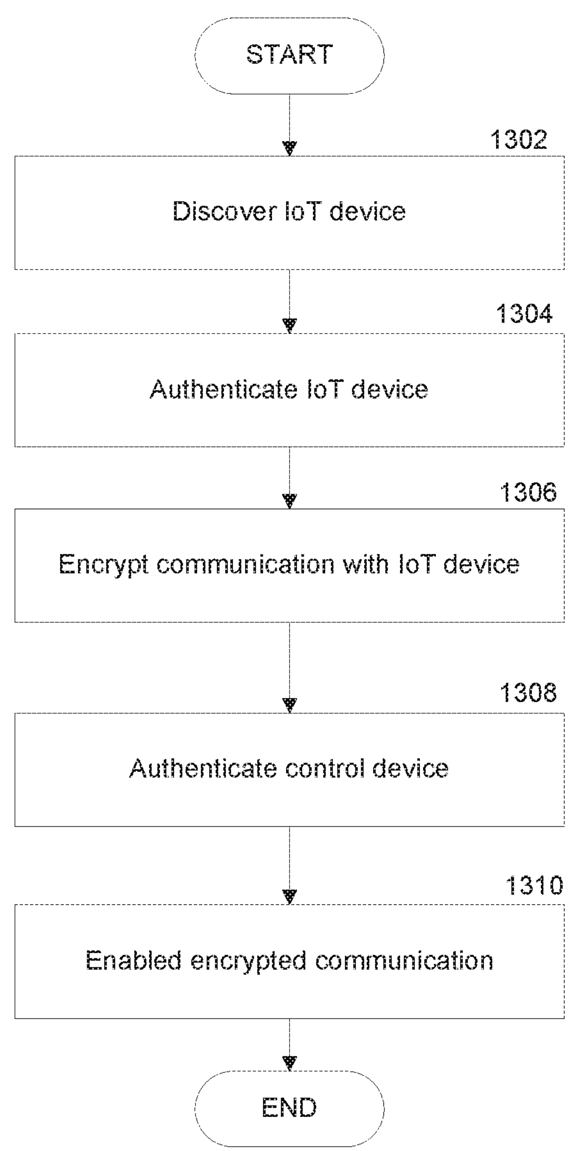
FIG. 13 is a flowchart illustrating a method of security using protocol tunneled messaging.

FIG. 13 is a flowchart illustrating a method of security using protocol tunneled messaging. In step 1302, the access points and devices in a network discover an IoT device broadcasting on an M2M protocol. Each device or access point discovered the IoT device separately. In step 1304 the devices and access points authenticate communications with the IoT device. There are a number of ways to authenticate communication between devices. Such ways include wirelessly transmitting a code between devices with a user confirmation, where one device (such as a smartphone) scans a barcode or QR code on the IoT device in order to obtain an authentication code, or where a user presses a connect approval button on each device within a predetermined time period. Discovering and authenticating each device enables the access points to both connect to the IoT device and to enable transmission forwarding between connected devices and the IoT device.

In step 1306, the access point encrypts communication with the IoT device. In step 1308, the control device or input device authenticates with the access point, thereby completing the network between IoT device, access point and control device. In step 1310, the communications between the control device and the access point are encrypted. Where each point of the chain is encrypted, secure communication over the network is enabled.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A method for operating a wireless local area network (WLAN) that includes a plurality of wireless access points, the method comprising:
- establishing the WLAN with a first wireless access point of the plurality of wireless access points, the WLAN broadcast on a client band;
- provisioning a second wireless access point of the plurality of wireless access points by:
  - causing the first wireless access point to communicate, direct to the second wireless access point, control signals in a dedicated control band that is outside of the client band;
- managing the WLAN by coordinating control functions for the plurality of wireless access points using the dedicated control band; and
- communicating network repeater data comprising files, streaming content, video game data, and other large communications downloaded and uploaded across the network, between the plurality of wireless access points over a backhaul channel that is dedicated to backhaul communications of backhaul data between wireless access points, the backhaul data not including the control signals.

2. The method of claim 1, wherein control functions include any of:
- updating a wireless bridge;
- coordinating client roaming between the plurality of wireless access points;
- timing synchronization between the plurality of wireless access points;
- channel assignments for each of the plurality of wireless access points;
- provisioning additional wireless access points to the WLAN;
- range measurement; or
- synchronization between the plurality of wireless access points for localization.

3. The method of claim 1, wherein each of the plurality of wireless access points includes a dedicated control radio for communication in the dedicated control band, wherein the dedicated control radio is not used to broadcast client-facing coverage in the client band.

4. The method of claim 1, wherein the dedicated control band includes a plurality of control channels at different frequencies within the dedicated control band and wherein communications in the dedicated control band includes frequency hopping between control channels.

5. The method of claim 1, wherein control signals are communicated in the dedicated control band using a direct connection topology between each of the plurality of wireless access points.

6. The method of claim 1, wherein network repeater data is communicated between the plurality of wireless access points over the dedicated backhaul channel using a first network topology, wherein the first network topology is any of a chain topology, a mesh topology, or a hub-and-spoke topology.

7. The method of claim 6, wherein control signals are communicated in the dedicated control band using a second network topology regardless of the first network topology for the backhaul channel, wherein the second network topology is a direct connection topology between each of the plurality of wireless access points.

8. The method of claim 1, further comprising:
- repeating the WLAN broadcast at each of the plurality of wireless access points.

9. The method of claim 1, wherein the dedicated control band is below 1 GHz.

10. The method of claim 1, wherein the dedicated control band is between 433 Mhz and 928 Mhz.

11. The method of claim 1, wherein the client band is any of the 2.4 GHz band or 5 GHz band.

12. A wireless access point apparatus comprising:
- a first radio configured to transmit and receive in first band;
- a second radio configured to transmit and receive in a second band; and
- a processor communicatively coupled to first and second radios, the processor configured to execute instructions to cause the wireless access point apparatus to:
  - establish a wireless local area network (WLAN), the WLAN broadcast in the first band using the first radio;
  - provision a plurality of wireless access points to join the WLAN by:
    - communicating, direct to each of the plurality of wireless access points, control signals in the second band using the second radio, the second band outside of the first band;
- manage the WLAN by coordinating control functions for the plurality of wireless access points over the second band; and
- communicate network repeater data comprising files, streaming content, video game data, and other large communications downloaded and uploaded across the network, between the plurality of wireless access points over a backhaul channel that is dedicated to backhaul communications of backhaul data between wireless access points, the backhaul data not including the control signals.

13. The wireless access point apparatus of claim 12, wherein control functions include any of:
- updating a wireless bridge;
- coordinating client roaming between the plurality of wireless access points;
- timing synchronization between the plurality of wireless access points;
- channel assignments for each of the plurality of wireless access points;

range measurement; or synchronization between the plurality of wireless access points for localization.

14. The wireless access point apparatus of claim 12, wherein the second radio is dedicated for communicating control signals is not used to broadcast client-facing WLAN coverage or backhaul communications.

15. The wireless access point apparatus of claim 12, wherein the second band includes a plurality of control channels at different frequencies within the second band and wherein communications in the second band includes frequency hopping between control channels.

16. The wireless access point apparatus of claim 12, wherein control signals are communicated in the second band using a direct connection topology between each of the plurality of wireless access points.

17. The wireless access point apparatus of claim 12, further comprising:

a third radio configured to transmit and receive packets from the Internet over a backhaul channel between the plurality of wireless access points, the third radio configured to communicate with the plurality of wireless access points in any of a chain topology, a mesh topology, or a hub-and-spoke topology.

18. The wireless access point apparatus of claim 12, wherein the second radio is configured to communicate control signals in the second band using a direct connection topology between each of the plurality of wireless access points regardless of the topology for the backhaul channel.

19. The wireless access point apparatus of claim 17, further comprising:

a fourth radio configured to communicate wirelessly in a machine-to-machine protocol to a client device, the wireless communication transmitted in a frequency different than frequencies used by the second radio.

20. The wireless access point apparatus of claim 12, wherein the processor is configured to execute further instructions to cause the wireless access point apparatus to further:

cause each of the plurality of wireless access points to repeat the WLAN broadcast in the first band.

21. The wireless access point apparatus of claim 12, wherein the first band is any of the 2.4 GHz band or 5 GHz band.

22. The wireless access point apparatus of claim 12, wherein the second band is below 1 GHz.

23. The wireless access point apparatus of claim 12, wherein the second band is between 433 Mhz and 928 Mhz.

24. A method for operating a wireless local area network (WLAN), the method comprising:

establishing the WLAN with a first wireless access point, the WLAN broadcast on a first band;

provisioning additional wireless access points to join the WLAN by:

causing the first wireless access point to communicate, direct to each of the additional wireless access points, control signals in a second band that is outside of the first band;

connecting a plurality of wireless access points comprising the WLAN to each other via a backhaul channel in the first band, the backhaul channel dedicated to backhaul communications of backhaul data between the plurality of wireless access points, the plurality of wireless access points including the first wireless access point and one or more of the additional wireless access points that joined the WLAN, the backhaul channel communicating network repeater data comprising files, streaming content, video game data, and other large communications downloaded and uploaded across the network, between the plurality of wireless access points over the backhaul channel, wherein the backhaul channel is dedicated to backhaul communications of backhaul data between wireless access points, the backhaul data not including the control signals; and managing the WLAN by coordinating control functions for the plurality of wireless access points using the second band.

25. The method of claim 24, wherein control functions include any of:

updating a wireless bridge;

coordinating client roaming between the plurality of wireless access points;

timing synchronization between the plurality of wireless access points;

channel assignments for each of the plurality of wireless access points;

range measurement; or synchronization between the plurality of wireless access points for localization.

26. The method of claim 24, wherein the second band is dedicated for communicating control signals between the plurality of wireless access points.

27. The method of claim 24, further comprising:

communicating network repeater data, between the plurality of wireless access points, using the backhaul channel.

28. The method of claim 24, wherein the backhaul channel has a first network topology, wherein the first network topology is either a chain topology, a mesh topology, or a hub-and-spoke topology.

29. The method of claim 27, wherein control signals are communicated in the second band using a second network topology regardless of the first network topology for the backhaul channel, wherein the second network topology is a direct connection topology between each of the plurality of wireless access points.

30. The method of claim 24, further comprising:

repeating the WLAN broadcast at each of the plurality of wireless access points.

31. The method of claim 24, wherein the first band is any of the 2.4 GHz band or 5 GHz band.

32. The method of claim 24, wherein the second band is below 1 GHz.

33. The method of claim 24, wherein the second band is between 433 Mhz and 928 Mhz.

* * * * *